(12) United States Patent
Lista et al.

(10) Patent No.: US 10,537,224 B2
(45) Date of Patent: Jan. 21, 2020

(54) APPLIANCES HAVING SOUND AND THERMAL INSULATION BASED ON VISCOELASTIC POLYURETHANE

(71) Applicant: Dow Global Technologies LLC, Midland, MI (US)

(72) Inventors: Guiseppe Lista, Tarragona (ES); Silvia Scussolin, Rolo (IT); Gianluca Casagrande, Castelfranco Emilia (IT)

(73) Assignee: Dow Global Technologies LLC, Midland, MI (US)

( * ) Notice: Subject to any disclaimer, the term of this patent is extended or adjusted under 35 U.S.C. 154(b) by 190 days.

(21) Appl. No.: 15/559,636

(22) PCT Filed: Feb. 22, 2016

(86) PCT No.: PCT/US2016/018879
§ 371 (c)(1),
(2) Date: Sep. 19, 2017

(87) PCT Pub. No.: WO2016/153664
PCT Pub. Date: Sep. 29, 2016

(65) Prior Publication Data
US 2018/0049618 A1    Feb. 22, 2018

(51) Int. Cl.
| | |
|---|---|
| *C08G 18/48* | (2006.01) |
| *A47L 15/42* | (2006.01) |
| *C08G 18/66* | (2006.01) |
| *C08G 18/76* | (2006.01) |
| *C08G 18/10* | (2006.01) |
| *C08G 18/32* | (2006.01) |
| *C08G 101/00* | (2006.01) |

(52) U.S. Cl.
CPC .......... *A47L 15/4209* (2016.11); *C08G 18/10* (2013.01); *C08G 18/3206* (2013.01); *C08G 18/4816* (2013.01); *C08G 18/4829* (2013.01); *C08G 18/6677* (2013.01); *C08G 18/7664* (2013.01); *C08G 2101/0066* (2013.01); *C08G 2101/0083* (2013.01); *C08G 2350/00* (2013.01)

(58) Field of Classification Search
CPC . A47L 15/4209; C08G 18/10; C08G 18/3206; C08G 18/4816; C08G 18/4829; C08G 18/4841; C08G 18/6677; C08G 18/7664; C08G 18/7671; C08G 2101/0066; C08G 2101/0083; C08G 2350/00; D06F 39/12
See application file for complete search history.

(56) References Cited

U.S. PATENT DOCUMENTS

| | | | |
|---|---|---|---|
| 2011/0168217 A1 | 7/2011 | Neff | |
| 2013/0178550 A1* | 7/2013 | Aou | ...................... C08G 18/283 521/176 |

FOREIGN PATENT DOCUMENTS

| | | | |
|---|---|---|---|
| EP | 449331 A | 10/1991 | |
| WO | 2010101689 A | 9/2010 | |
| WO | 2011086976 A | 7/2011 | |
| WO | 2013117685 A | 8/2013 | |

OTHER PUBLICATIONS

Gayathri et al., International Journal of Scientific and Engineering Research, vol. 4, Issue 5, May 2013, pp. 301-308.

* cited by examiner

*Primary Examiner* — John M Cooney

(57) ABSTRACT

Thermal and acoustic insulation is provided to an appliance or a component thereof through a layer of a viscoelastic polyurethane foam. The selection of a viscoelastic foam of this density provides efficient thermal insulation as well as acoustic insulation.

17 Claims, No Drawings

APPLIANCES HAVING SOUND AND THERMAL INSULATION BASED ON VISCOELASTIC POLYURETHANE

This invention relates to appliances having applied sound and thermal insulation.

Household appliances such as dishwashers, clothes driers, washing machines, vacuum cleaners, etc. often are manufactured with thermal insulation and are also insulated reduce noise and vibration.

The acoustic insulating material is commonly a fiber insulation batt, a bitumen or asphalt mastic, or a high density polymer. These materials provide acoustic insulation, but are poor thermal insulators. Accordingly, it has been necessary to incorporate multiple layers of insulating material to obtain both acoustic and thermal insulation. This leads to undesired increases in product weight and production costs.

Furthermore, these conventional insulating materials are in most instances separately manufactured and fabricated to form specialized parts that are assembled onto the appliance.

It has been suggested to apply certain types of polyurethane materials as the insulation. This has several potential advantages, in that the polyurethane material can be applied as a spray, which makes application easy and potentially expensive. In WO 2013/117685, for example, there are described appliances having a sprayed polyurethane elastomer which functions as an insulating material. This polyurethane elastomer is highly filled and non-cellular, so the density is 1 to 3 g/cm$^3$. This rather heavy material adds a great deal of weight and is not especially effective as an acoustic insulating material.

WO 2011/086076 and US 2011/0168217 describe attempts to use rigid or semi-rigid polyurethane foams as both thermal and acoustic insulation for appliances. These foams have the advantage of adding less weight to the appliance, as compared with the high density polyurethane elastomers of WO 2013/117685. However, as the data in WO 2011/086076 clearly shows, these rigid polyurethane foams do not provide a good combination of thermal and acoustic properties. With these foams, there is in fact a trade-off between these properties, so that when the foams provide effective acoustic insulation, they have poorer thermal insulating properties, and vice versa.

This invention is in one aspect an appliance comprising at least one thermally and acoustically insulated component, wherein the insulated component has an insulation structure applied to at least one surface thereof, the insulation structure including at least one layer of a viscoelastic polyurethane foam, the viscoelastic polyurethane being characterized in that:

a) the viscoelastic polyurethane foam has a resiliency value of at most 15% as measured according to ASTM 3574;

b) the viscoelastic polyurethane foam has a recovery time of at least 3 seconds as measured according to ASTM D3574 Test M; and c) the viscoelastic polyurethane foam is made in the reaction of an aromatic polyisocyanate with a mixture of isocyanate-reactive materials that includes at least 20 weight-percent, based on the combined weight of all isocyanate-reactive materials in the mixture, of at least one polyol having a molecular weight of at least 750, a hydroxyl equivalent weight of 225 to 450 and 2 to 4 hydroxyl groups per molecule, and water in an amount of at least 0.2 parts per 100 parts by weight of the mixture of isocyanate-reactive materials, wherein the isocyanate index is 60 to 100.

The invention is also a method of insulating an appliance, comprising applying an insulation structure to at least one component of the appliance, wherein the insulation structure includes at least one layer of a viscoelastic foam, the viscoelastic polyurethane being characterized in that:

a) the viscoelastic polyurethane foam has a resiliency value of at most 20% as measured according to ATM 3574;

b) the viscoelastic polyurethane foam has a recovery time of at least 3 seconds as measured according to ASTM D3574-08 Test M; and c) the viscoelastic polyurethane foam is made in the reaction of an aromatic polyisocyanate with a mixture of isocyanate-reactive materials that includes a major amount, based on the combined weight of all isocyanate-reactive materials in the mixture, of at least one polyol having a molecular weight of at least 750, a hydroxyl equivalent weight of 225 to 450 and 2 to 4 hydroxyl groups per molecule, and water in an amount of at least 0.2 parts per 100 parts by weight of the mixture of isocyanate-reactive materials, wherein the isocyanate index is 60 to 100.

Surprisingly, the viscoelastic foam provides effective acoustic as well as thermal insulation, in contrast with, for example, the rigid and semi-rigid polyurethane foams of WO 2011/086076 and US 2011/0168217. The viscoelastic foam can be applied easily and inexpensively, using spraying techniques, for example, that allow the foam to be formed in place and in that way avoiding costs associated with pre-manufacture and fabrication. Another advantage is seen when the viscoelastic foam has a somewhat low volume density. This permits particularly effective insulation (both acoustic and thermal) to be obtained at a given (and generally low) added mass.

The appliance may be, for example, a household or commercial mechanical device such as a dishwasher, oven, refrigerator, freezer, clothes washing machine, clothes dryer, garbage disposal, trash compactor, vacuum cleaner, HVAC (heating, ventilation and/or air conditioning) device, and the like.

The appliance includes at least one component that is acoustically and thermally insulated in accordance with the invention. The "component" can be any part, assembly or subassembly of the appliance. The component may be, for example, a housing, such as for a motor, pump, fluid handling system or a part thereof; an exterior panel of the appliance, such as a cabinet that encloses the functioning components of the appliance or a bottom, top, vertical wall or door of such a cabinet; an exterior shell that includes two or more such panels; or any functional component or device that forms part of the appliance.

An insulation structure is applied to such a component. The insulation structure includes at least one layer of viscoelastic polyurethane foam. The viscoelastic foam is a flexible foam, characterized in that it has a resiliency value of at most 20% as measured according to ATM 3574. The resiliency value may be at most 15%, at most 8%, or at most 5%.

The viscoelastic foam is further characterized in having a recovery time of at least 3 seconds as measured according to ASTM D3574-08 Test M. The recovery time may be at least 5 seconds or at least 10 seconds.

The viscoelastic foam may have a volume density of, for example, 50 to 500 kg/m$^3$. In some embodiments has a volume density of 250 to 500 kg/m$^3$, 300 to 500 kg/m$^3$ or 300 to 450 kg/m$^3$. In other embodiments, the volume density of the viscoelastic foam is 50 to 300 kg/m$^3$, 50 to 250 kg/m$^3$ or 100 to 150 kg/m$^3$. Volume densities for purposes of this invention are calculated without consideration of the weight of the foam attributable to any particulate fillers as may be present. Thus, a measured volume density is adjusted by subtracting the weight of any such fillers from the mass of the foam. Volume density is the adjusted mass divided by sample volume.

The viscoelastic foam is made in the reaction of an aromatic polyisocyanate with a mixture of isocyanate-reactive materials that includes a major amount, based on the combined weight of all isocyanate-reactive materials in the mixture, of at least one polyol having a molecular weight of at least 750 and a hydroxyl equivalent weight of 225 to 450, and water in an amount of at least 0.2 parts per 100 parts by weight of the mixture of isocyanate-reactive materials.

The mixture of isocyanate-reactive materials contains two or more liquid (at 23° C. and 1 atmosphere pressure) isocyanate-reactive compounds that react at least difunctionally with isocyanate groups. One of the isocyanate-reactive compounds is water. Water consumes two isocyanate groups to form a urea linkage and liberate carbon dioxide, which functions as a blowing gas. Water constitutes at least 0.2 parts by weight per 100 parts by weight of the mixture of isocyanate-reactive materials, and may constitute, for example 0.2 to 3, 0.25 to 2, or 0.25 to 1.5, parts by weight per 100 parts by weight of the mixture.

The mixture of isocyanate-reactive materials includes, in addition to the water, at least one polyol having a number average molecular weight of at least 750, a hydroxyl equivalent weight of 225 to 450 and 2 to 4 hydroxyl groups per molecule. The number average molecular weight in some embodiments is 800 to 1300 or 800 to 1200, and the hydroxyl equivalent weight in such embodiments is 250 to 400 or 275 to 400. Molecular weights are suitably determined by gel permeation chromatography. Equivalent weight is conveniently measured by titration methods. This polyol may be a polyether polyol, such as a homopolymer of 1,2-propylene oxide or a copolymer of 1,2-propylene oxide and ethylene oxide. The hydroxyl groups may be primary or secondary or some of each; in some embodiments, at least 70% or at least 90% of the hydroxyl groups are secondary. This polyol in some embodiments has 3 to 4 hydroxyl groups per molecule. If a mixture of such polyols is present, the mixture may have an average of 2.8 to 3.5 or 2.8 to 3.3 hydroxyl groups per molecule. In the case of a polyether polyol, this functionality is a "nominal" functionality, which is the average number of oxyalkylatable groups on the initiator compounds used in preparing the polyether. The nominal functionality of a polyether polyol often is slightly higher than the actual hydroxyl functionality of the polyol due to side reactions that occur during the polymerization of alkylene oxides to form the polyether.

The polyol having a molecular weight of at least 750, a hydroxyl equivalent weight of 225 to 450 and 2 to 4 hydroxyl groups per molecule, or mixture of such polyols, constitutes at least 20%, preferably at least 50%, more preferably at least 60%, and even more preferably at least 70% of the total weight of isocyanate-reactive compounds in the mixture. It may constitute up to 99.8% by weight thereof, up to 95% by weight thereof, up to 90% by weight thereof or up to 85% by weight thereof. For purposes of making this calculation, fillers, catalysts, physical blowing agents and surfactants are not considered to be isocyanate-reactive compounds.

The mixture of isocyanate-reactive materials may include one or more compounds, in addition to the water and the polyol(s) having a molecular weight of at least 750, a hydroxyl equivalent weight of 225 to 450 and 2 to 4 hydroxyl groups per molecule. Such additional isocyanate-reactive compounds have one or more, preferably two or more, isocyanate-reactive groups per molecule. Examples of isocyanate-reactive groups are primary or secondary hydroxyl groups, primary or secondary amino groups, thiol groups, and the like. Compounds having one or more primary or secondary amino groups are less preferred, and if present at all, preferably constitute at most 20 weight-percent, more preferably at most 5 weight-percent, of the mixture of isocyanate-reactive materials. These additional isocyanate-reactive materials are different from the polyol having a molecular weight of at least 750, a hydroxyl equivalent weight of 225 to 450 and 2 to 4 hydroxyl groups per molecule, in that at least one of these parameters is different, i.e., the molecular weight is less than 750, the hydroxyl equivalent weight is less than 225 or more than 450, and/or the functionality is less than 2 or more than 4.

These additional isocyanate-reactive materials may constitute zero to 49.8 weight-percent of the mixture of isocyanate-reactive materials. In some embodiments they may constitute 4.8 to 39.8 weight percent thereof, 4.8 to 29.8 weight percent thereof or 9.8 to 29.8 weight percent thereof.

Among the additional isocyanate-reactive materials are monols or polyols having a hydroxyl equivalent weight of 451 or more, such as 500 to 4000, 500 to 2000 or 800 to 1750. Among the additional isocyanate-reactive materials of this type are polyether monols and polyether polyols. Such polyether monols and polyols may be homopolymers of 1,2-propylene oxide or copolymers of propylene oxide and ethylene oxide. Such copolymer may be, for example, copolymers of 50 to 80 weight-% ethylene oxide and correspondingly 50 to 20 weight-% propylene oxide, or copolymers of greater than 80 weight-% propylene oxide and less than 20 weight-% ethylene oxide.

Other useful additional isocyanate-reactive materials include low equivalent weight compounds having at least two hydroxyl groups, at least one hydroxyl group and at least one primary or secondary amino group, at least one primary amino group, at least one primary amino group and at least one secondary amino group, or at least two secondary amino groups, and which has an equivalent weight per isocyanate-reactive group of up to 100 in the case of a diol and 150 otherwise, preferably 30 to 100 and more preferably 30 to 75. Examples of these include diethanolamine, triethanolamine, diethylene glycol, ethylene glycol, glycerin, trimethylolpropane, trimethylolethane, pentaerythritol, erythritol and 1,4-butanediol, and alkoxylates thereof.

The aromatic polyisocyanate is one or more compounds having an average of at least 2 aromatically bound isocyanate groups per molecule. The aromatic polyisocyanate may have, for example, 2 to 6, preferably 2 to 4, isocyanate groups per molecule. If a mixture of aromatic isocyanate compounds is used, the mixture may have, for example, an average of 2 to 4 or 2.3 to 3.2 isocyanate groups per molecule. The isocyanate equivalent weight may be, for example, 80 to 250, 85 to 200, or 120 to 180. Examples of useful aromatic polyisocyanates include m-phenylene diisocyanate, toluene-2,4-diisocyanate, toluene-2,6-diisocyanate, naphthylene-1,5-diisocyanate, 1,3- and/or 1,4-bis(isocyanatomethyl)cyclohexane (including cis- and/or trans isomers), methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate.

Modified aromatic polyisocyanates that contain urethane, urea, biuret, carbodiimide, uretoneimine, allophonate, isocyanurate or other groups formed by reaction of an isocyanate group with itself or an isocyanate-reactive compound such as an alcohol, amine or water are also useful.

Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. "Polymeric MDI", which is a mixture of PMDI and MDI, can be used. Toluene-2,4-diisocyanate, toluene-2,6-diisocyanate and mixtures thereof are generically referred to as TDI, and all can be used. Another preferred polyisocyanate is MDI, PMDI and/or a polymeric MDI modified with a polyether polyol to form a quasi-prepolymer having urethane groups, the prepolymer having an isocyanate equivalent weight of 120 to 180 and an average isocyanate functionality of 2.3 to 3.2.

Enough of the aromatic polyisocyanate is used to provide an isocyanate index of 60 to 100. Isocyanate index refers to 100 times the ratio of isocyanate groups to isocyanate-reactive groups provided by the starting materials (i.e., prior to the consumption of any of those groups in the curing reaction that forms the foam.) A preferred isocyanate index is 60 to 85, and a more preferred isocyanate index is 70 to 85.

The viscoelastic foam is prepared by forming a reaction mixture containing the mixture of isocyanate-reactive materials and the polyisocyanate(s), and curing the mixture. The water and various other isocyanate-reactive materials all can be mixed together before they are combined with the polyisocyanate. Alternatively, they can be combined with the polyisocyanate individually (i.e., as separate streams), or can be formed into one or more submixtures that are then combined with the polyisocyanate. Due to the speed of the curing reaction, it is preferred to combine the water and other isocyanate-reactive compounds with the polyisocyanate simultaneously or nearly simultaneously (such as within 5 seconds). The reaction usually proceeds spontaneously at room temperature (22° C.). Elevated temperatures can be used to speed the cure or drive it toward completion. This can be done by heating some or all of the ingredients prior to combining them, by applying heat to the reaction mixture as it cures, or some combination of each. Curing is continued until the reaction mixture has expanded and cured sufficiently to form a stable foam.

In some embodiments, the reaction mixture is applied directly to the component(s) to be insulated and cured thereon to form the viscoelastic foam. The reaction mixture in some embodiments is applied by spraying it onto the component(s).

Alternatively, the reaction mixture is foamed separately (i.e., apart from the component(s) on which it is to be used) to form a viscoelastic foam, which is subsequently fabricated (if necessary) to a desired geometry and affixed to the component(s) to be insulated. Spraying, molding, free-rise (slabstock), and other foaming methods are suitable for making the viscoelastic foam. Once made, the foam can be affixed to the appliance component in various ways, such as through the use of an adhesive, melt-bonding, or via mechanical means. The foam in some embodiments is fabricated to fit onto the component without need for additional fastening means.

To facilitate rapid curing, the reaction mixture preferably contains one or more reaction catalysts. Suitable catalysts include, for example, including tertiary amines, cyclic amidines, tertiary phosphines, various metal chelates, acid metal salts, strong bases, various metal alcoholates and phenolates and metal salts of organic acids. Examples of metal-containing catalysts are bismuth, cobalt and zinc salts. Catalysts of most importance are tertiary amine catalysts, cyclic amidines and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

A reactive amine catalyst, such as DMEA (dimethylethanolamine) or DMAPA (dimethylaminopropyl amine), or an amine-initiated polyol, acting as an autocatalytic polyol, may also be used to reduce VOC's (volatile organic compounds).

Examples of tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, tin mercaptides, tin thioglycolates and the like. Tin carboxylates in which the carboxylate group has 6 to 18 carbon atoms are sometimes associated with lower VOCs in the VE foam. Tin catalysts are generally used in conjunction with one or more tertiary amine catalysts, if used at all.

Catalysts are typically used in small amounts, for example, each catalyst being employed from about 0.0015 to about 5% by weight of polyol(s). Tin catalysts are generally used in very small amounts within this range, such as from 0.0015 to 0.25 weight-%.

It is highly preferred to include a foam-stabilizing surfactant in the reaction mixture. The foam-stabilizing surfactant helps stabilize the gas bubbles formed during the foaming process until the polymer has cured. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

It may be desirable to include an auxiliary blowing agent in the reaction mixture. Such auxiliary blowing agents include physical (endothermic) blowing agents such as various low-boiling chlorofluorocarbons, fluorocarbons, hydrocarbons and the like; as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid. Any or all of these auxiliary blowing agents can be omitted.

In addition to the foregoing components, the reaction mixture may contain various other optional ingredients such as cell openers; fillers such as melamine, calcium carbonate, barium sulfate, core-shell rubber particles, polymer particles (including ground elastomer particles such as recycled rubbers as well as grafted polymer particles such as are present in so-called polymer polyol products); pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; plasticizers, paraffin oil, plant or animal oils or fats, epoxidized vegetable oils and/or animal fats, wax particles, gel particles and the like.

The layer of viscoelastic foam in the insulation structure may be, for example, 1 to 100 mm thick, 5 to 100 mm thick, 10 to 100 mm thick, 10 to 50 mm thick, or 17 to 50 mm thick. Greater thicknesses in general correspond to greater acoustic and thermal insulation, but weight increases with increasing thickness as well and so the thickness of the viscoelastic foam layer is in many cases a trade-off between insulation values on the one hand and space and weight limitations on the other.

In certain embodiments, the thickness of the viscoelastic foam layer is selected together with the volume density of such layer, such that the viscoelastic foam layer has an areal density (including the weight of any fillers as may be present of 1000 to 12,000 grams per square meter of substrate surface area which is covered by the viscoelastic foam layer. In some embodiments, the areal density may be 2500 to 10,000, 3000 to 9000, 3000 to 7500, or 3000 to 6000 grams per square meter of substrate area covered by the viscoelastic foam layer. Within these ranges, especially good thermal insulation is obtained together with good sound and vibration absorption. The areal density is equal to the weight of the foam layer divided by the total substrate surface area onto which the foam layer is applied; this value is also equal to the volume density of the foam times the thickness of the layer. Thus, somewhat thicker viscoelastic foam layers are needed to achieve the aforementioned areal densities when the volume density of the foam is low, and somewhat thinner layers are needed when the volume density of the foam is higher.

Within the volume density ranges described herein, lower volume density viscoelastic foam layers generally provide better thermal insulation, at a given areal density, than higher volume density foams. The volume density of the foam is believed to have little affect on noise and vibration dampening at a given areal density. For a given areal density, somewhat thicker layers of lower volume density viscoelastic foams are preferred over thinner layers of higher volume density foams, due to the better thermal properties.

In some specific embodiments, the foam volume density (without regard to any fillers as may be present) is 50 to 300 kg/m$^3$, the thickness of the foam layer is 3.3 to 100 mm and the areal density (including the weight of any fillers) is 1000 to 10,000 g/m$^2$, 3000 to 7500 g/m$^2$ or 3500 to 6000 g/m$^2$. In other specific embodiments, the foam volume density is 100 to 150 kg/m$^3$, the thickness of the foam layer is 17 to 50 mm, and the areal density is 3000 to 7500 g/m$^2$, preferably 3000 to 6000 g/m$^2$.

The layer of viscoelastic foam is in some embodiments the only component of the insulation structure; that is, the viscoelastic foam layer (apart from means for affixing the foam layer in place) constitutes the entire insulation structure on a particular component of the appliance.

In other embodiments, the insulation structure includes other materials, typically in the form of one or more layers of additional insulating (acoustic, thermal or both) material that may underlay or overlay (or both) the layer of viscoelastic foam. Such additional layers may include, for example, one or more layers of a high volume density (>500 kg/m$^3$) polymer foam; one or more layers of a mastic; one or more layers of a fiber batt; one or more layers of a low volume density (<50 kg/m$^3$) polymer foam; various types of baffling, and the like. The thickness of any of these layers may be, for example, 1 to 100 mm, 1 to 50 mm, 1 to 25 mm or 1 to 20 mm.

The viscoelastic foam layer may have a lambda value of less than 0.1 W/m-° K, as measured according to EN 12667.

The lambda value of the viscoelastic foam layer may be less than 0.075 W/m-° K or less than 0.06 W/m-° K.

The insulated component in some embodiments exhibits a sound transmission loss at least 8 decibels, at least 10 decibels, or at least 12 decibels greater than the sound transmission loss of the uninsulated (bare) component. For purposes of this invention, sound transmission loss is measured according to EN ISO 15186:2010, with the transmission loss calculated according to the relationship:

$$TL = L_{p,s} - L_{l,r} - 6DB.$$

The following examples are provided to illustrate the invention, but are not intended to limit the scope thereof. All parts and percentages are by weight unless otherwise indicated. In the following examples:

MEG is monoethylene glycol.

The Cell Opener is a high molecular weight copolymer of propylene oxide and a major amount of ethylene oxide.

DEOA is diethanolamine.

Catalyst A is a commercially available bis(2-dimethylaminoethyl)ether solution.

Catalyst B is a commercially available triethylenediamine solution.

Catalyst C is a commercially available tin catalyst.

Surfactant A is a silicone surfactant commercially available as Ortegol 501 from Evonik.

Surfactant B is a silicone surfactant commercially available as Tegostab B8715 LF2 from Evonik.

Polyol A is a nominally trifunctional poly(propylene oxide), having a molecular weight of about 1000 and a hydroxyl equivalent weight of about 335.

Polyol B is a nominally trifunctional, 5000 molecular weight ethylene oxide-capped poly(propylene oxide).

Polyol C is a nominally trifunctional, 450 molecular weight poly(propylene oxide).

The Isocyanate is prepolymer of a high molecular weight trifunctional polyether polyol and a mixture of MDI and PMDI. The Isocyanate has an average isocyanate functionality of 2 to 3 and an isocyanate equivalent weight of approximately 140 g/mol.

To produce the following examples, viscoelastic foams are prepared from the following formulations:

|  | Parts By Weight | | |
| --- | --- | --- | --- |
| Component | Formulation 1 | Formulation 2 | Formulation 3 |
| MEG | 0.585 | 0.6 | 0.573 |
| Glycerin | 0.195 | 0.2 | 0.191 |
| DEOA | 0.78 | 0.8 | 0.763 |
| Cell Opener | 3.9 | 0 | 3.817 |
| Catalyst A | 0.146 | 0.150 | 0.219 |
| Catalyst B | 1.949 | 4.200 | 3.053 |
| Catalyst C | 0.195 | 0.33 | 0.315 |
| Water | 0.224 | 0.500 | 0 |
| Polyol A | 75.458 | 77.420 | 70.076 |
| Polyol B | 9.747 | 10 | 9.542 |
| Polyol C | 4.873 | 5 | 4.771 |
| Surfactant A | 1.95 | 0 | 1.91 |
| Surfactant B | 0 | 0.8 | 0 |
| Zeolite | 0 | 0 | 4.77 |
| Isocyanate | To 75 index | To 75 index | To 75 index |
| % Water based on isocyanate-reactive materials | 0.23% | 0.52% | 0 |
| Volume Density | 500 kg/m$^3$ | 300 kg/m$^3$ | >800 kg/m$^3$ |

Viscoelastic foams made from Formulations 1 and 2 have resiliency values below 15% as measured according to ATM 3574 and recovery times greater than 3 seconds as measured according to ASTM D3574-08 Test M.

Test specimens are prepared as follows: All components except the Isocyanate are mixed to form a curative. The curative and Isocyanate are processed through a spray robot to form a reaction mixture that is sprayed onto steel plates (500×500×0.5 mm, weighing 650 g) and cured on the steel plates. The weights of the coated plates and the foam thickness are measured in each case.

The thermal conductivities of the coated plates are determined in accordance with EN 12667.

Sound transmission loss is measured according to EN ISO 15186:2010. Transmission loss (TL) is calculated according to the relationship:

$$TL = L_{p,s} - L_{I,r} - 6DB.$$

wherein $L_{p,s}$ is the sound pressure level in decibels (DB) in the room containing the sound source and $L_{I,r}$ is the measured sound pressure in DB in the room containing the test specimen. Sound transmission loss is measured in the frequency range 50 to 10,000 Hz.

Damping loss is measured by suspending the coated plate using two elastic strings so it is free to vibrate. The suspended plate is suspended by striking it with a hammer. The hammer is a PCB 086D05 impact hammer controlled by a PCB 353 B18 accelerometer. The acceleration is measured at a point close to a bottom corner, and five excitation points are chosen in different areas of the plate. For each excitation point, three measurements are made using an 8 channel Samurai Sound Book and Software. Structural reverberation time is calculated in the $\frac{1}{3}^{rd}$ octave frequency bands from 100 to 800 Hz. Results are averaged to obtain a reverberation time RT, calculated from a decay of 20 DB but referred to a standardized decay of 60 DB. Tests are conducted at room temperature.

Examples 1-5 are made by coating the steel plates with either Formulation 1 or Formulation 2, at coating weights as indicated in Table 1. Comparative Sample A is the uncoated steel, and Comparative Sample B is a steel panel coated with a bitumen layer. Comparative C is made by coating a steel plate with Formulation 3. Test results from these various samples are as indicated in Table 1.

and transmission loss very significantly, but is a poor thermal insulator. The dense polyurethane elastomer coating of Comparative Sample C performs similarly to Comparative Sample B, with good acoustic properties but poor thermal properties.

Examples 1-5 show the highly beneficial effect of a viscoelastic foam layer. Damping and transmission loss are comparable to those of Comparative Samples A and B. Unlike Comparative Samples A and B, Examples 1-5 exhibit very low lambda values, indicating that the viscoelastic foams provide excellent thermal resistance in addition to excellent acoustic properties.

In Examples 6-10, particulate additives are included in Formulations 1, and therefore are incorporated into the foam. Comparative Samples D, E and F are made using Formulation 3, in each case modified with a particulate additive. The additives in each case are:

| Designation | Foam Formulation | Additive |
| --- | --- | --- |
| 6 | 1 | Core-shell rubber particles (13.1% based on foam weight) |
| 7 | 1 | Barium sulfate (27.3% based on foam weight) |
| 8 | 1 | Barium sulfate (27.3% based on foam weight) |
| 9 | 1 | Recycled tires (18.4% based on foam weight) |
| 10 | 1 | Recycled tires (18.4% based on foam weight) |
| D | 3 | Core-shell rubber particles (13.2% based on foam weight) |
| E | 3 | Barium sulfate (27.6% based on foam weight) |
| F | 3 | Recycled tires (18.6% based on foam weight) |

For each of Examples 6-8 and Comparative Samples D and E, layers of the foam material are applied to steel plates by spraying the filled formulation onto the plates, and curing

TABLE 1

| Designation | Description | Mass g | Coating Mass, g | Areal Density g/m² | Approx. coating thickness mm | Lamdba W/m-° K. | Damping Factor | Transmission Loss, DB |
| --- | --- | --- | --- | --- | --- | --- | --- | --- |
| A* | Uncoated Steel | 650 | 0 | N/A | 0 | N/A | 0.003 | 24.4 |
| B | Steel, Bitumen coating | 1584 | 934 | 3736 | 4 | 0.18 | 0.18 | 33.6 |
| 1 | Steel + Form. 1 | 2080 | 1430 | 5720 | 11 | 0.07 | 0.14 | 36.4 |
| 2 | Steel + Form. 1 | 2800 | 2150 | 8600 | 17 | 0.07 | 0.18 | 36.9 |
| 3 | Steel + Form. 2 | 1460 | 810 | 3240 | 11 | 0.05 | 0.16 | 32.6 |
| 4 | Steel + Form. 2 | 1515 | 865 | 3460 | 11.5 | 0.05 | 0.17 | 32.2 |
| 5 | Steel + Form. 2 | 1780 | 1130 | 4520 | 15 | 0.05 | 0.18 | 32.5 |
| C | Steel + Form. 3 | 3580 | 2930 | 11720 | 11 | 0.16 | 0.16 | 39.2 |

*Not an example of the invention.

Comparative Sample A represents a baseline case from which the acoustic and thermal insulation abilities of the coatings can be assessed. In Comparative Sample B, the conventional bitumen coating increases the damping factor the formulation on the plates. For examples, 9 and 10 and Comparative Sample E, the filler material is mixed manually into the foam formulation, which is then spread onto the plates and cured. This results in somewhat higher volume densities for these samples. Results of the testing of these samples are as indicated in Table 2.

TABLE 2

| Design. | Coating | Coating Mass, g | Approx. coating thickness, mm | Vol. Density[1], kg/m³ | Area Density[2], g/m² | Lambda, W/m-° K. | Damping Factor | Transmission Loss, DB |
|---|---|---|---|---|---|---|---|---|
| 6 | Form. 1, core-shell rubber | 1410 | 15 | 326 | 5640 | 0.07 | 0.19 | 36.1 |
| 7 | Form. 1, barium sulfate | 1435 | 11 | 379 | 5720 | 0.07 | 0.16 | 34.6 |
| 8 | Form. 1, barium sulfate | 2155 | 15 | 418 | 8620 | 0.07 | 0.20 | 37.8 |
| 9 | Form. 1, recycled tires | 2400 | 10 | 783 | 9600 | 0.07 | 0.15 | 37.5 |
| 10 | Form. 1, recycled tires | 3150 | 20 | 514 | 12,600 | 0.07 | 0.23 | 39.8 |
| D* | Form. 3, core-shell rubber | 2570 | 11 | 831 | 10,280 | 0.16 | 0.17 | 38.6 |
| E* | Form. 3, barium sulfate | 4160 | 10 | 1,204 | 16,640 | 0.16 | 0.26 | 39.8 |
| F* | Form. 3, recycled tires | 2850 | 11 | 843 | 11,400 | 0.16 | 0.17 | 37.7 |

[1]Volume densities exclude the weight of the fillers.
[2]Areal densities include filler weights.

Examples 6-10 all provide excellent thermal and acoustic insulation. The additives in these cases have almost no effect on thermal insulation properties, but improve the acoustic properties compared to Examples 1-5. The acoustic properties of Examples 6-10 are comparable to Comparative Samples D, E and F. Comparative Examples D, E and F have poor thermal insulating properties.

In Examples 11-17, the insulating system includes a first layer of viscoelastic foam (Formulation 1 or 2) and a second layer of a nearly compact polyurethane foam (Formulation 3). In making these Examples, the viscoelastic foam layer is applied and cured as before, and then Formulation 3 is sprayed atop the viscoelastic foam layer and cured to produce the final sample. Results from testing these Examples are as indicated in Table 3.

Examples 11-17 show that even better acoustic properties can be obtained, without loss of thermal insulation properties, by applying a two-layer insulation system including a viscoelastic foam layer and a nearly compact polyurethane overcoat.

Example 18

Viscoelastic foam formulations 4, 5 and 6 are made by making small adjustments to foam formulation 2 to lower the volume density and, in the case of formulation 6, reduce the tensile modulus. Foams 4, 5 and 6 have the following properties:

| Property | Foam 4 | Foam 5 | Foam 6 |
|---|---|---|---|
| Volume Density, g/L (ASTM D3574) | 213 | 107 | 116 |
| Lambda, 20/40 C (mW/K*m) | 53 | 41 | 40 |

TABLE 3

| Designation | Viscoelastic Foam | Approx. coating thickness, mm | Compact Layer | Approx. coating thickness, mm | Applied Coating Weight | Lambda W/m-° K. | Damping Factor | Transmission Loss, DB |
|---|---|---|---|---|---|---|---|---|
| 11 | Form. 1 | 10 | Form. 3 | 5 | 3270 | 0.07 | 0.21 | 39.5 |
| 12 | Form. 1 | 10 | Form. 3 | 5 | 3340 | 0.07 | 0.13 | 40.4 |
| 13 | Form. 2 | 10 | Form. 3 | 5 | 2460 | 0.07 | 0.16 | 38.5 |
| 14 | Form. 2 | 15 | Form. 3 | 5 | 2695 | 0.07 | 0.17 | 39.9 |
| 15 | Form. 2 | 10 | Form. 3 | 10 | 4170 | 0.07 | 0.20 | 40.8 |
| 16 | Form. 1 | 10 | Form. 3, BaSO₄ | 5 | 3520 | 0.07 | 0.13 | 40.6 |
| 17 | Form 1 | 10 | Form. 3, BaSO₄ | 5 | 3880 | 0.07 | 0.22 | 40.9 |

-continued

| Property | Foam 4 | Foam 5 | Foam 6 |
|---|---|---|---|
| Resiliency, % (ASTM D3574) | 17 | 12 | 8 |
| 50% Compression Set (%) ASTM D3574 | 4.2 | 1.8 | 11.9 |
| Tear Str., N/m, ASTM D3574 | 0.18 | 0.13 | 0.10 |
| Elongation at Break, % ASTM D3575 | 127 | 102 | 129 |

These foams have recovery times greater than 3 seconds as measured according to ASTM D3574-08 Test M.

Each of foam formulations 4, 5 and 6 is separately applied to the drum and the door of a commercial household dishwasher, by applying the foam formulation directly on top of the external surface of the drum and door, respectively, and permitting the applied formulation to cure at room temperature and form a foam layer adhered to the underlying metal. In the case of foam formulation 4, the amount of foam applied is 11 kg. In the case of each of foam formulations 5 and 6, the amount of foam applied is 5.9-6.7 kg. The surface area covered by the foam is approximately 1.7 m². Areal density for foam formulation 4 is 6470 g/m², and 3470-3941 g/m² for each of formulations 5 and 6. Average foam layer thickness is about 30.4 mm for foam formulation 4, 32.4-36.8 mm for foam formulation 5, and 29.9-34.0 mm for foam formulation 6. When operated, the dishwashers release significantly less noise than when untreated, and use less energy due to the reduced amount of heat lost through the drum and the door.

What is claimed is:

1. An appliance comprising at least one thermally and acoustically insulated component, wherein the insulated component has an insulation structure applied to at least one surface thereof, the insulation structure including at least one layer of a viscoelastic polyurethane foam having a thickness of 17 to 50 mm and an areal density of 3000 to 7500 g/m², the viscoelastic polyurethane being characterized in that:
   a) the viscoelastic polyurethane foam has a resiliency value of at most 20% as measured according to ASTM 3574;
   b) the viscoelastic polyurethane foam has a recovery time of at least 3 seconds as measured according to ASTM D3574 Test M;
   c) the viscoelastic polyurethane foam has a lambda value of less than 0.075 W/m-° K as measured according to EN 12667; and
   d) the viscoelastic polyurethane foam is made in the reaction of an aromatic polyisocyanate with a mixture of isocyanate-reactive materials that includes at least 20 weight-percent, based on the combined weight of all isocyanate-reactive materials in the mixture, of at least one polyol having a molecular weight of at least 750, a hydroxyl equivalent weight of 225 to 450 and 2 to 4 hydroxyl groups per molecule, and water in an amount of at least 0.2 parts per 100 parts by weight of the mixture of isocyanate-reactive materials, wherein the isocyanate index is 60 to 100;
   wherein the appliance is a dishwasher, oven, refrigerator, freezer, clothes washing machine, clothes dryer, garbage disposal, trash compactor, vacuum cleaner or HVAC device.

2. The appliance of claim 1, which is a dishwasher.

3. The appliance of claim 1, wherein the thermally and acoustically insulated component is a housing for a motor, pump, fluid handling system or a part of such a housing; a cabinet that encloses functional components of the appliance; a bottom, top, vertical wall or door of such a cabinet; or a functional component or device that forms part of the appliance.

4. The appliance of claim 1, the volume density of the viscoelastic polyurethane foam is 250 to 500 kg/m³, the resiliency value of the foam is at most 15%, and the mixture of isocyanate-reactive materials includes at least 50 weight-percent, based on the combined weight of all isocyanate-reactive materials in the mixture, of the polyol having a molecular weight of at least 750, a hydroxyl equivalent weight of 225 to 450 and 2 to 4 hydroxyl groups per molecule.

5. The appliance of claim 1 wherein the viscoelastic polyurethane foam has a resiliency of at most 8% and a recovery time of at least 10 seconds.

6. The appliance of claim 1 wherein the viscoelastic foam layer constitutes the entire insulation structure.

7. The appliance of claim 1 wherein insulation structure includes one or more layers of additional acoustic and/or thermal insulating material.

8. The appliance of claim 7 wherein the additional layer(s) is one or more of a high density polymer foam; one or more layers of a mastic; one or more layers of a fiber batt; or one or more layers of a low density polymer foam.

9. A method of insulating an appliance, comprising applying an insulation structure to at least one component of the appliance, wherein the insulation structure includes at least one layer of a viscoelastic foam having a thickness of 17 to 50 mm and an areal density of 3000 to 7500 g/m², the viscoelastic polyurethane being characterized in that:
   a) the viscoelastic polyurethane foam has a resiliency value of at most 20% as measured according to ASTM 3574;
   b) the viscoelastic polyurethane foam has a recovery time of at least 3 seconds as measured according to ASTM D3574-08 Test M;
   c) the viscoelastic polyurethane foam has a lambda value of less than 0.075 W/m-° K as measured according to EN 12667; and
   d) the viscoelastic polyurethane foam is made in the reaction of an aromatic polyisocyanate with a mixture of isocyanate-reactive materials that includes at least 20 weight-percent, based on the combined weight of all isocyanate-reactive materials in the mixture, of at least one polyol having a molecular weight of at least 750, a hydroxyl equivalent weight of 225 to 450 and 2 to 4 hydroxyl groups per molecule, and water in an amount of at least 0.2 parts per 100 parts by weight of the mixture of isocyanate-reactive materials, wherein the isocyanate index is 60 to 100;
   wherein the appliance is a dishwasher, oven, refrigerator, freezer, clothes washing machine, clothes dryer, garbage disposal, trash compactor, vacuum cleaner or HVAC device.

10. The method of claim 9, wherein the appliance is a dishwasher.

11. The method of claim 9, wherein the thermally and acoustically insulated component is a housing for a motor, pump, fluid handling system or a part of such a housing; a cabinet that encloses functional components of the appliance; a bottom, top, vertical wall or door of such a cabinet; or a functional component or device that forms part of the appliance.

12. The method of claim 9, wherein the aromatic polyisocyanate and mixture of isocyanate-reactive materials are applied directly to the component and cured thereof to form the viscoelastic polyurethane foam.

13. The method of claim 9 wherein the viscoelastic polyurethane foam is foamed apart from the component, and then affixed to the component.

14. The method of claim 9 wherein the viscoelastic polyurethane foam has a resiliency of at most 8% and a recovery time of at least 10 seconds.

15. The method of claim 9 wherein the viscoelastic foam layer constitutes the entire insulation structure.

16. The method of claim 9 wherein insulation structure includes one or more layers of additional acoustic and/or thermal insulating material.

17. The method of claim 16 wherein the additional layer(s) is one or more of a high density polymer foam; one or more layers of a mastic; one or more layers of a fiber batt; or one or more layers of a low density polymer foam.

* * * * *